(12) United States Patent
Farineau et al.

(10) Patent No.: US 7,620,012 B2
(45) Date of Patent: Nov. 17, 2009

(54) DEVICE FOR LOCALLY ROUTING LOCAL TRAFFIC WITHIN A RADIOCOMMUNICATIONS NETWORK

(75) Inventors: Jean Farineau, Levallois Perret (FR); Christelle Aime, Boulogne Billancourt (FR); Jean-Noël Lignon, Frouzins (FR)

(73) Assignee: Alcatel, Paris (FR)

( * ) Notice: Subject to any disclaimer, the term of this patent is extended or adjusted under 35 U.S.C. 154(b) by 473 days.

(21) Appl. No.: 11/134,493

(22) Filed: May 23, 2005

(65) Prior Publication Data
US 2005/0259614 A1  Nov. 24, 2005

(30) Foreign Application Priority Data
May 24, 2004  (FR)  .................................. 04 51012

(51) Int. Cl.
*H04W 4/00* (2009.01)
(52) U.S. Cl. .................. 370/329; 370/336; 370/400; 370/401; 455/445; 455/561
(58) Field of Classification Search .......... 370/310, 370/310.1, 310.2, 328, 329, 331, 335, 338, 370/347, 465, 466, 467, 468, 401–403, 461; 455/445, 561, 560, 432.3, 426.1, 554.5, 554.2, 455/555
See application file for complete search history.

(56) References Cited

U.S. PATENT DOCUMENTS

| | | | |
|---|---|---|---|
| 5,537,610 A | | 7/1996 | Field et al. |
| 5,629,974 A | * | 5/1997 | Rajala et al. ................ 455/466 |
| 6,597,912 B1 | * | 7/2003 | Lu et al. ..................... 455/445 |
| 7,058,076 B1 | * | 6/2006 | Jiang .......................... 370/465 |
| 7,116,646 B1 | * | 10/2006 | Gustafson et al. .......... 370/313 |
| 2003/0088769 A1 | * | 5/2003 | Quick et al. ............... 713/169 |

FOREIGN PATENT DOCUMENTS

WO  WO 96/35311 A  11/1996

* cited by examiner

*Primary Examiner*—Jean A Gelin
(74) *Attorney, Agent, or Firm*—Sughrue Mion, PLLC

(57) ABSTRACT

A device (D) is dedicated to local routing of local traffic between optionally mobile communications terminals. The device (D), which is installed, for example, in a traffic router (R1) connected via a transmission network portion to a radiocommunications network including a call switch (MSC), comprises processor means serving, in the event of first and second up traffic channels being set up between calling and called terminals (T1, T2) and the call switch (MSC), and first and second down traffic channels being set up between the call switch (MSC) and the calling and called terminals (T1, T2), to compare selected data conveyed in the first up traffic channel and in at least one down traffic channel set up after the first up traffic channel and in a selected time window, and then in the event of the comparison indicating that there is a correlation between the data conveyed in those channels, to order the traffic router (R1) to route locally and directly the traffic from the first up channel to the second down channel and from the second up channel to the first down channel, without the traffic being sent to the call switch (MSC).

19 Claims, 4 Drawing Sheets

DEVICE FOR LOCALLY ROUTING LOCAL TRAFFIC WITHIN A RADIOCOMMUNICATIONS NETWORK

CROSS-REFERENCE TO RELATED APPLICATIONS

This application claims the benefit of French Patent Application No. 04 51 012 filed May 24, 2004.

BACKGROUND OF THE INVENTION (1) Field of the Invention

The invention relates to the field of radiocommunications networks, whether by satellite or terrestrial, and it relates more particularly to routing traffic between communications terminals attached to such networks.

(2) Description of Related Art

The term "radiocommunications network, whether by satellite or terrestrial" is used therein to mean a communications network such as a mobile telephone network of the GMS/GPRS (global system for mobile communications, general packet radio system) or of the UMTS (universal mobile telephone system) type, in which traffic exchanged by communications terminals needs to transit via a call switching center (known as a mobile services switching center (MSC)) for handling calls set up in a given geographical area, with transit between said area and the MSC taking place via a portion of a transmission network in the form of a terrestrial link or a communications satellite link coupled to two transmission equipments, each connected to a traffic router. The two traffic routers and the two transmission equipments may be installed either at the so-called "A-bis" interface level of the network, i.e. between certain base stations and the associated base station controller, or else at the so-called "A-ter" interface level, i.e. between a base station controller and a transcoder coupled to the associated MSC and serving to convert compressed voice into digitized speech at 64 kilobits per second (kbps) or even at the so-called "A" interface level, i.e. between said transcoder and said MSC.

By way of example, in satellite transmission networks, and as is known to the person skilled in the art, using a remote link via a satellite constitutes a solution that is particularly attractive for operators when they desire to deploy networks rapidly over sites that are very widespread geographically speaking and/or dispersed over large territories, without that requiring terrestrial infrastructure that is cumbersome and expensive.

Unfortunately, the cost of operating a satellite retransmission network, in the present state of the art, is almost insurmountable given the cost of renting satellite resources.

In an attempt to remedy that drawback, at least two solutions have been proposed. A first solution consists in using MSCs that are relocated downstream from the transmission equipments, which amount to installing an MSC in each remote site. However that solution is very expensive, in particular because it requires complex protocol layers to be processed on a large number of channels, and it turns out to be prohibitive outside situations in which distant sites, to which MSCs have been relocated, cover a very large number of network subscribers, typically at least 400,000.

A second solution consists in constituting specific local configurations integrating all of the elements of the network but for reduced capacity. However that solution requires specific development that is very expensive and therefore not profitable. In addition, that solution turns out to be incompatible with existing networks because they generally make use of proprietary solutions that require complex integration processes.

BRIEF SUMMARY OF THE INVENTION

Since no known solution is entirely satisfactory, an object of the invention is to improve the situation.

To this end, the invention provides a device dedicated to locally routing local traffic between optionally mobile communications terminals, for a traffic router connected to a transmission network portion of a radiocommunications network.

During the procedure for setting up a local call from a calling terminal A to a called terminal B, four traffic channels are established: a first up channel for terminal A to the MSC, a down channel associated with this first channel, a second up channel from terminal B to the MSC, and a down channel associated with the second channel. In chronological order, the first traffic channel to be established is the up channel from the caller, and simultaneously the associated down channel; with the up and down channels relating to the called party generally being established later on during the call set-up procedure. The procedure for setting up a call terminates when the called party answers; the traffic conveyed by the first up channel is then practically identical to the traffic on the second down channel and similarly the traffic conveyed by the second up channel is practically identical to that on the first down channel. Nevertheless the data constituting the up traffic and the data constituting the opposite down traffic is not absolutely identical since the traffic is processed in time by a transcoder TC (which converts GSM format to ADPCM format at 64 kilobits per second (kbps) prior to routing via the MSC, followed by re-encoding into GSM format); the correlation operations defined below enable this lack of absolute identity to be taken into account.

The local routing device is characterized by the fact that it comprises processor means serving, once the first and second up traffic channels have been set up between the calling and called terminals and the call switch of the network, and first and second down traffic channels have been set up between said call switch and the calling and called terminals:

to compare selected data conveyed in the first up traffic channel and in at least one down traffic channel set up after the first up traffic channel and in a selected time window; and then when the comparison indicates correlation between the data being conveyed, to instruct the traffic router to route locally and directly the traffic from the first up channel to the second down channel and from the second up channel to the first down channel, and then ceasing to send traffic in both directions (up and down) over the transmission network portion and the call switch.

The routing device of the invention may have other characteristics that can be taken separately or in combination, and in particular:

its processor means may serve to compare data conveyed in the first up traffic channel with data in each down traffic channel set up after the first up traffic channel and in the selected time window;

its processor means may serve to copy the data for comparison (as conveyed by the first up channel) and then apply to the copied data a time offset selected as a function of the go-and-return time for reaching the call switch and returning therefrom, and to compare the data that has been copied and offset in time with the data conveyed by each down channel that is set up after the first up traffic channel and within the selected time window;

its processor means may serve to select from amongst the down channels set up in the selected time window that channel in which the selected data satisfies one or more identity criteria in comparison with the data conveyed by the first up traffic channel; the channel as selected in this way is subsequently identified as being the second channel;

its processor means may also serve to compare the selected data conveyed by the second up channel with the data conveyed by the first down channel;

its processor means may also serve, in the event of a comparison indicating a correlation in the conveyed data, to instruct the traffic router to route locally and directly the traffic from the first up channel to the second down channel and from the second up channel to the first down channel, without sending the traffic to the call switch;

the compared data may be signaling data and/or traffic data;

when the data is signaling data, it may be representative at least of the call identifier of the called terminal. Under such circumstances, the processor means are arranged to consider the compared data as being correlated when representing the call identifier of the called terminal. Signaling data can also be representative of the call identifier of the calling terminal. Under such circumstances, the processor means are arranged to consider that the compared data is correlated when it likewise represents the call identifier of the calling terminal. However, instead or in combination therewith, the signaling data may be representative of a traffic identifier associated with a channel identifier. Under such circumstances, the processor means is arranged to consider that the compared data is correlated when it represents the traffic identifier and the associated channel identifier;

with traffic data, the data may be in the form of binary signals characteristic of the presence of speech or of silence. Under such circumstances, the processor means are arranged to consider the compared data as being correlated when it represents identical binary signals;

the processor means may perform a compression function serving to minimize the capacity needed for transmitting traffic over the transmission network. Under such circumstances, a decompression function is provided at the other end of the transmission network portion (central site end), in order to restore the initial traffic as it was before compression, and identical functions are provided in the down direction (compression at the central site end, and decompression at the local routing device end (or remote site));

in a first variant, the traffic data taken into account in the correlation process may be decompressed voice data. In a second variant, the traffic data may be the values of at least one critical parameter representative of compressed voice data. In a third variant, the traffic data may be a linear or a non-linear combination of critical parameters representative of compressed voice data. In these three variants, the processor means are preferably arranged to evaluate the covariance between the conveyed data streams, and then to retain those channels whose covariance value with the first channel exceeds a determined threshold, and to consider as correlated the channel that presents the highest covariance value;

its processor means may also serve, on receiving an instruction for indicating that third up and down channels are being set up between a third communications terminal (calling or called) and the call switch, for the purpose of setting up a "conference" mode connection with the calling and called terminals, to instruct the router to interrupt routing traffic locally and directly in order to return to conventional routing via the call switch;

its processor means may serve, in the event of a request for monitoring the first and second up channels, to instruct the traffic router to duplicate the traffic conveyed by the first and second up channels firstly to route it locally and directly, and secondly to transmit it via the transmission network portion to the call switch;

its processor means may serve, once local and direct routing have been established, to instruct the traffic router to transmit to the other traffic router to which it is coupled via the transmission network portion, binary flags indicating that the connection between the calling and called terminals is ongoing. In a variant, its processor means may serve, once local and direct routing has been set up, to instruct the traffic router to transmit control bits in compressed form to the other traffic router via the transmission network portion, said control bits being associated with time alignment words corresponding to rest frames or to non-valid frames, with this transmission continuing throughout the duration of the call between the calling and called terminals so as to enable a continuous stream of traffic to be reproduced at the other router until the end of the call, which stream serves to maintain normal functioning of the network, which generally tests both ends of the retransmission links for the presence of the traffic streams for the channel that has been set up, and continues to do so until the end-of-call procedure; and its processor means may also serve, once local and direct routing have been set up, to instruct the traffic router to reduce, preferably progressively to a selected value, e.g. equal to zero, a deferred transmission delay of the traffic frames for routing locally and directly, which delay was initially representative of the go-and-return time needed to reach the call switch and to return therefrom.

The invention also provides a traffic router for a radiocommunications network including a transmission network portion and a call switch, and fitted with a local routing device of the type presented above.

The invention is particularly well adapted, although not exclusively, to mobile communications networks, for example such as cellular type networks using time division multiple access (TDMA) or code division multiple access (CDMA), and in particular the so-called GSM, GPRS, EDGE, and UMTS networks. The invention is also adapted to networks for satellite communication making use of satellites in geostationary, medium, or low earth orbit (GEO, MEO, or LEO). The invention is also adapted to remote links via terrestrial communications networks, e.g. making use of cable connections, optical fibers, or microwave beams.

The invention is particularly advantageous, although in non-exclusive manner, in networks making use of one or more satellite remote links over some of their connections. Furthermore, the invention applies to any type of transmitted stream: voice, data, video, fax, radar, and regardless of whether these streams are transmitted in raw or in compressed form.

BRIEF DESCRIPTION OF THE DRAWINGS

Other characteristics and advantages of the invention appear on examining the following detailed description and the accompanying drawings, in which.

DETAILED DESCRIPTION OF THE INVENTION

The accompanying drawings may serve not only to add to the description of the invention, but they may also contribute to defining it, where appropriate.

The invention seeks to enable local traffic to be routed locally within a radiocommunications network using at least one network portion involving terrestrial or satellite transmission.

Figure 1:
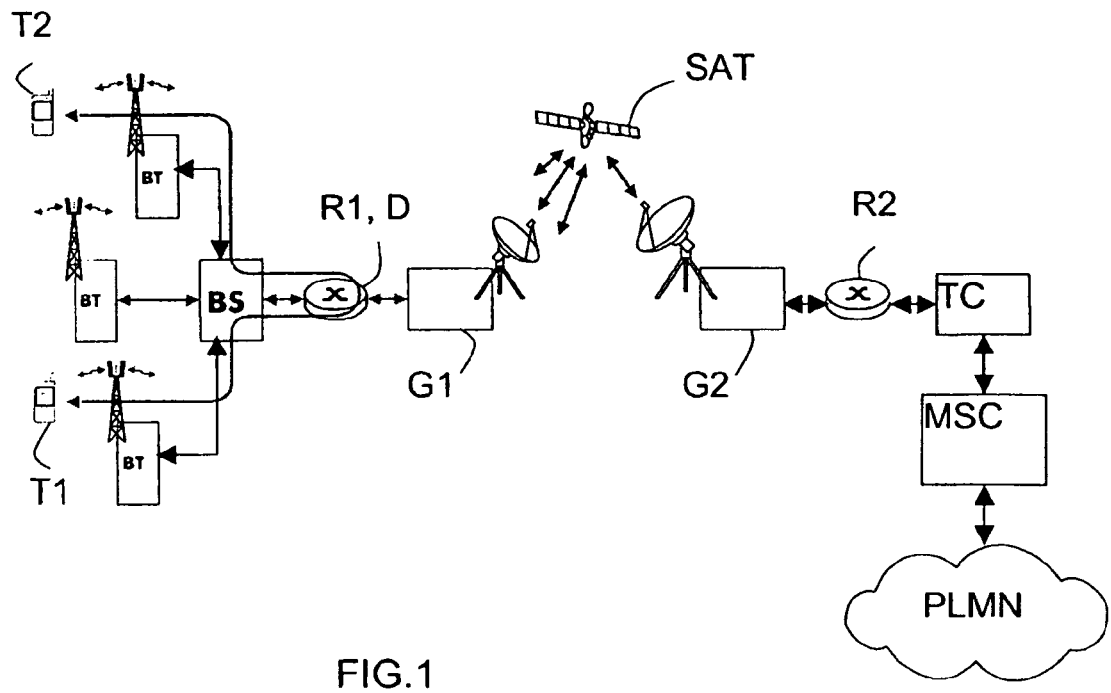
FIG. 1 is a diagram showing an example of a radiocommunications network with a satellite remote link and fitted with a device of the invention.
Figure 2:
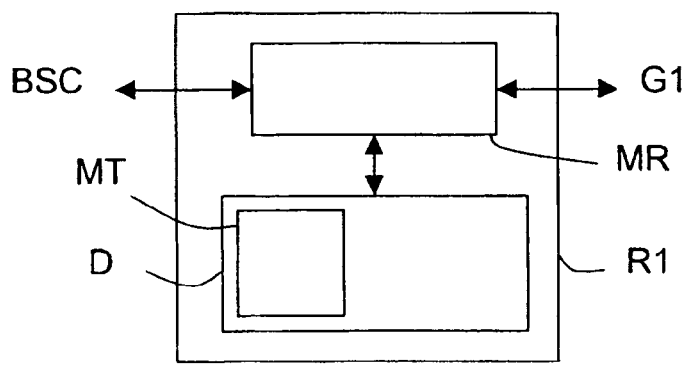
FIG. 2 is a block diagram showing an example of a traffic router fitted with a device of the invention.

Reference is made initially to FIGS. 1 and 2 while describing an application of the invention to a radiocommunications network with a satellite remote link. It is important to observe that such a network may include one or more local routing devices D of the invention.

Below, it is assumed that the radio network is of the GSM/GPRS type. However the invention is not limited to this type of network. It relates to any terrestrial radio network, and in particular networks of the EDGE or UMTS types, and more generally to terrestrial telecommunications networks such as those that are of the TDMA or the CDMA types. The invention also relates to satellite communications networks.

Furthermore, it should be understood below that the term "mobile communications terminal" covers any mobile communications equipment capable of exchanging data in the form of radio signals with a base station BTS. Thus, for example, a terminal may comprise user equipment such as a mobile (or cellular) telephone, or a portable computer, or a personal digital assistant (PDA) provided with radiocommunications equipment. However the invention also covers calls between terminals (or stations) that are fixed, but that communicate via mobile communications networks. The notion of being "mobile" is not limiting in any way to the present invention, it is merely intended to illustrate an example of the invention being applied to a radio network of the cellular type.

It is considered below that the mobile communications terminals are mobile telephones Ti.

As shown in FIG. 1, a GSM/GPRS network with satellite retransmission comprises in outline (but in sufficient detail to understanding the invention):

base transceiver stations (BTSs) having radio equipment for establishing links with mobile communications terminals;

one or more base station controllers (BSCs) having one or more BTSs connected thereto and serving to manage radio resources;

at least one satellite link comprising a communications satellite SAT and first and second satellite ground equipments G1 and G2 generally in the form of respective gateways serving to transmit traffic and signaling via the satellite SAT;

at least one mobile services switching center (MSC) for managing calls set up within the geographical area covered by the BTSs coupled to the BSCs to which it is itself coupled via the satellite SAT, and connected to the core of the network (in this case of the public land mobile network (PLMN) type), and preferably also (and as shown) coupled to a transcoder TC for converting compressed voice into speech digitized at 64 kbps, and vice versa;

first and second traffic routers R1 and R2 respectively coupled to the first and second gateways G1 and G2 for communicating with the satellite and serving to route the traffic they receive as a function of traffic destinations. In the example shown, the satellite link is installed at the level of the A-ter interface of the network, i.e. between the base station controller BSC and the transcoder TC. Consequently, the first traffic router R1 is connected to the base station controller BSC. However, the satellite link could be installed at the level of the A-bis interface of the network, i.e. between the base stations BTS and the associated base station controller BSC, or indeed at the A interface, i.e. between the transcoder TC and the central call witch MSC. These interfaces are defined by the standard G.703 for the physical layer and the standard G.704 for framing (generally at 2048 kbps).

In such a network, data is exchanged over the A-bis interface via multiple signaling channels (at least one channel per BTS station), each occupying either one byte per frame (for 64 kbps channels), or else two bits per frame (for 16 kbps channels).

When the data exchanged is traffic data, the channels used are traffic channels (TCH). Each TCH then occupies either 2 bits per frame (for a "full rate" (FR) type channel at 16 kbps), or 1 bit per frame (for a "half rate" (HR) type channel at 8 kbps). For voice communication one TCH is used in each direction, and they are identical in size and position within each incoming or outgoing so-called E1 frame at any given physical port.

It may be observed that a similar scheme applies to traffic channels at the A-ter interface. Nevertheless, signaling channels are less numerous since the volume of signaling exchanged over the A-ter interface is much smaller than over the A-bis interface.

In a network with a satellite remote link and of conventional type, i.e. in a network in which the invention is not implemented, a call is set up between a calling, first mobile telephone T1 and a called second mobile telephone T2 in a succession of steps, including the main steps listed below.

The user of the first mobile telephone T1 dials the number of the second mobile telephone T2. Signaling messages are then exchanged between the first mobile telephone T1 and the central call switch MSC in order to characterize the call, and in particular the called number T2. The central call switch MSC then uses its subscriber database to determine the location of the called telephone T2. Here, and as shown, it is assumed that the called telephone T2 is a network subscriber situated in the same geographical sector that is managed by the same central call switch MSC.

An exchange of signaling messages then takes place between the central call switch MSC and the second mobile telephone T2 in order to cause it to start ringing. A first up traffic channel CM1 and down traffic channel CD1 are established between the first mobile telephone T1 and the central call switch MSC, and then a second up traffic channel CM2 and down traffic channel CD2 are established between the second mobile telephone T2 and the central call switch MSC, thus constituting a total of four circuits (two up and two down).

If the user of the second mobile telephone T2 answers, then the call setup procedure comes to an end and the four circuits are used throughout the duration of the call for the purpose of conveying voice (in this case in compressed form). The signaling present during the call at the A-bis interface then consists essentially in measurements going up from the first and second mobile telephones T1 and T2 to the controller BSC for use in particular in deciding whether to change cell during the call. As soon as one of the two users has hung up, all four circuits are released.

Each of the four circuits makes use of a capacity of 16 kbps or 8 kbps depending on the type of voice code used. Consequently, a local call between two mobile telephones makes use of a capacity of 32 kbps or of 64 kbps over the satellite link G1, SAT, G2. In the presence of a large number of local calls, the total capacity required in the satellite link can thus be very large, which makes the use of a satellite remote link almost prohibitive in terms of rental costs.

The object of the invention is thus to remedy this drawback by proposing a local routing device D for installing in each first router R1 or for being connected thereto. Such a device D is shown diagrammatically, by way of non-limiting example in FIG. 2.

The device is for enabling local traffic (i.e. local calls) to be routed locally without going via the satellite SAT to the central call switch MSC and back again, in order to limit as much as possible the amount of satellite capacity that is used.

To this end, the device D comprises a treatment module MT for acting with the first traffic router R1 when the first and second up traffic channels CM1 and CM2 and the first and second down traffic channels CD1 and CD2 are set up between the first and second mobile telephones T1 and T2 and the central call switch MSC, using the mechanism described above.

More precisely, the treatment module MT is coupled to the router module MR of the first router R1 in order to observe the data reaching it and make comparisons between certain selected data items conveyed in each first up traffic channel CM1 that has recently been set up and at least one, and preferably each, down traffic channel that is set up after the first up traffic channel CM1 and within a selected time window FT. When the result of the comparison indicates that there is a correlation between the data being conveyed, the treatment module MT then instructs the first traffic router R1, and more precisely its routing module MR, to route directly and locally the traffic conveyed by the first up channel CM1 to the second down channel CD2, and the traffic conveyed by the second up channel CM2 to the first down terminal CD1, suspending the transmission of traffic via the central call switch MSC.

In other words, the treatment module MT triggers analysis whenever an up channel CM1 is newly set up, and then, if a down channel CD2 is set up thereafter, after a determined lapse of time, corresponding in general to the minimum time for end-to-end transmission of traffic, and then within a selected margin, the treatment module MT attempts to correlate some of the data conveyed by said down channel CD2 with data of the same type conveyed by the up channel CM1. This time range extends generally from the instant at which the up channel CM1 is set up plus a the minimum end-to-end transmission delay, to the same set-up instant plus a maximum end-to-end transmission delay, thus constituting a time window FT which serves as a criterion for admitting a down channel CD2 as a candidate for being taken into account in the process of being correlated with the selected data conveyed by the first up channel CM1.

The correlation process is performed in a sliding window over a finite number of samples, which number defines the duration of the correlation window, and is selected as a function of the configuration of the network and is programmed in the treatment module MT.

The transmission delay introduced in particular by the remote link via the satellite (G1, SAT, and G2) is taken into account in the correlation process with a time margin for covering extreme cases of relative delay.

Figure 3:
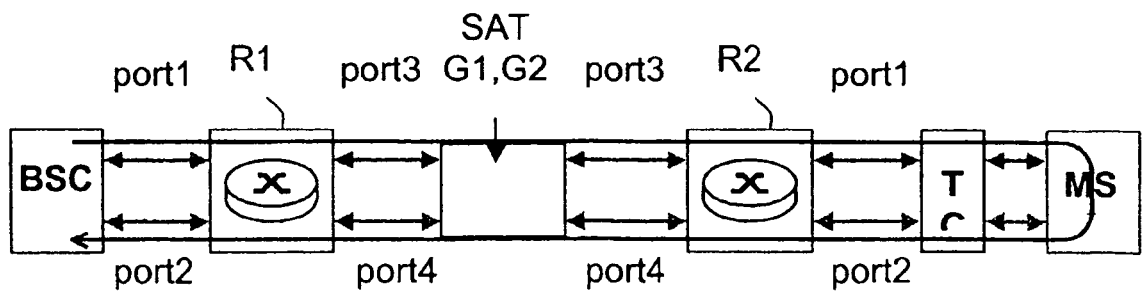
FIG. 3 is a diagram showing an example of port localization and the TCH channel paths prior to activating local routing in accordance with the invention.

An example of a call being set up is described below with reference to FIGS. 3 and 4. In this example, at instant t1 a new (first) up channel CM1 (of the TCH type) is set up on incoming port No. 1 of the first router R1 (on the BSC side). This is a call initiated by the first mobile telephone T1. The first up channel CM1 initially conveys only rest frames (represented in FIG. 4 by a gray rectangle CE), prior to speech frames being present (represented in FIG. 4 by black rectangles P), alternating with frames of silence (represented in FIG. 4 by white rectangles S).

This first up channel CM1 is transmitted by the first router R1, e.g. to its outgoing port No. 3, to the satellite link G1, SAT, and G2, so as to reach an incoming port No. 3 of the second router R2 from which it leaves via outgoing port No. 1 in order to reach the transcoder TC where it is reproduced in the form of a 64 kbps channel. It then reaches the central call switch MSC which, observing that it is destined for a second mobile terminal T2 attached to the same BSC as the BSC from which it comes, routes it (using the normal routing process) via the transcoder TC. At this stage it becomes a down traffic channel CD2 which is compressed and transmitted to the second router R2, e.g. via its incoming port No. 2. It leaves the second router R2, e.g. via its outgoing port No. 4, and travels back over the satellite link G2, SAT, and G1 so as to reach an incoming port No. 4 of the first router R1 which it leaves via outgoing port No. 2 in order to reach the controller BSC so that it forwards the base station BTS covering the cell in which the second mobile terminal T2 is situated.

Figure 5:
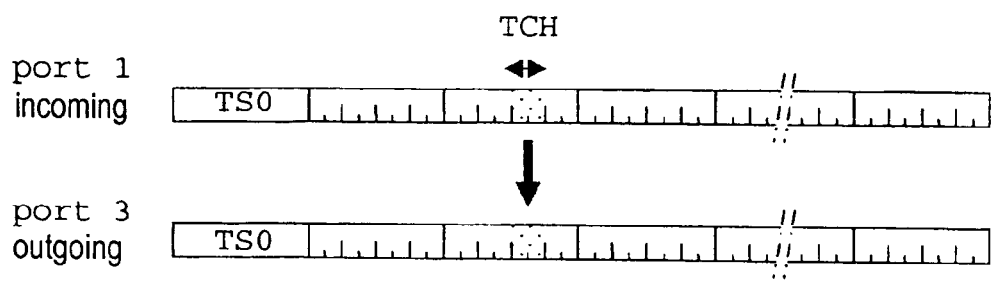
FIG. 5 is a diagram showing an example of transparent routing prior to activating local routing in accordance with the invention.

Throughout this stage, and as shown in FIG. 5, the first and second traffic routers R1 and R2 operate in totally transparent manner (the first up TCH channel CM1 established at the input of R1 on incoming port No. 1 is reproduced identically at the output of R1 on outgoing port No. 3, as is likewise input to R2 on its incoming port No. 3 and reproduced identically at the output of R2 on its outgoing port No. 1, and the second down TCH channel CD2 established at the input of R2 on its incoming port No. 2 is reproduced identically at its output on its outgoing port No. 4, and likewise its input to R2 via its incoming port No. 4 and is reproduced identically at the output of R1 on its outgoing port No. 2).

In the example shown, the first up channel CM1, which begins entering the first router R1 at instant t1 via its incoming port No. 1, begins to leave this first router R2 at instant t2 on its outgoing port No. 2, in the form of the second down channel CD2. Furthermore, a second up channel CM2 coming from the second terminal T2 begins by entering the first router R1 at instant t3, e.g. via its incoming port No. 2, and begins to leave the same first router R1 at instant t4, e.g. via its outgoing port No. 1, in the form of the first down channel CD1.

The time delays t1-t2 and also t4-t3 are due essentially to the satellite link (about 2×270 milliseconds (ms) for the go-and-return time via the satellite, in each direction), plus the time delays introduced by the network equipment which generally amount to less (typically 60 ms).

Figure 6:
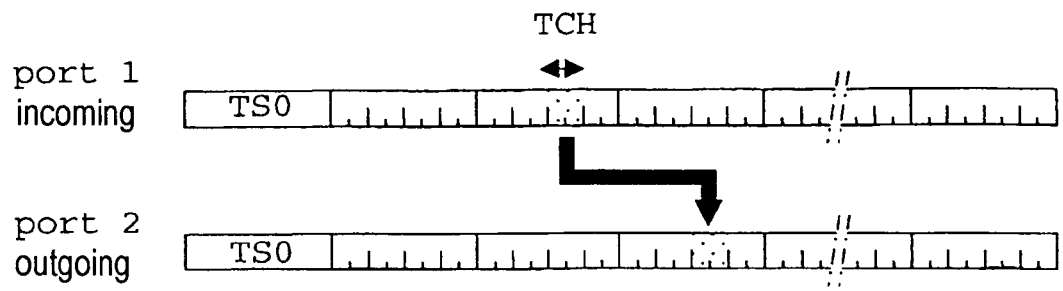
FIG. 6 is a diagram showing a first example of channel shifting by cross-connection in a central call switch MSC.
Figure 7:
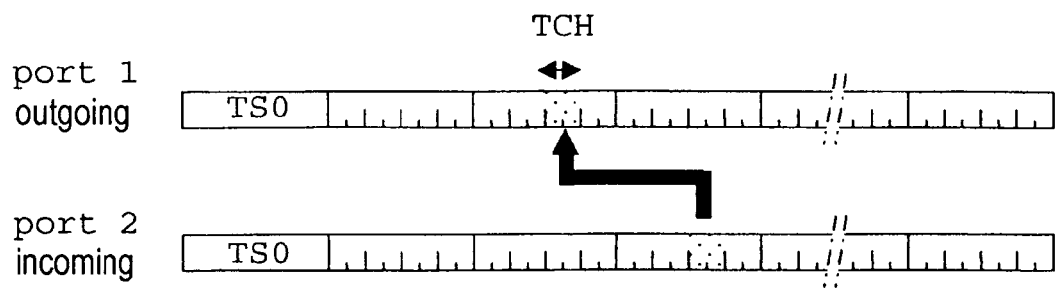
FIG. 7 is a diagram of a second example of channel shifting by cross-connection in a central call switch MSC.

As shown in FIG. 6, it is important to observe that the position of the second down channel CD2 on outgoing port No. 2 has no connection with the position of the first up channel CM1 on incoming port No. 1, given that the central call switch MSC cross-connects traffic channels. Conversely, as shown in FIG. 7, the position of the first up channel CD1 on outgoing port No. 1 has no connection with the position of the second up channel CM2 on incoming port No. 2. Preferably, the correlation process is also performed on the return stream of a both-way call. The treatment module MT of the device D then compares certain selected data conveyed by the (second) up traffic channel CMj following the setting up of the first up channel CM1, with data conveyed by the down channel CD1, channel No. 1 being used here as a reference.

In other words, once up and down channels No. 1 have been set up, all of the down channels that are set up subsequent to said event are identified within the limits of the admission window FT which defines the minimum to maximum delay for data transit. Thereafter, each of the channels j satisfying this criterion is processed in succession, firstly making sure that there is correlation between the delayed up channel CM1 and the candidate down channel CDj, and, where appropriate, confirming that with the return traffic (delayed up channel CMj with the down channel CD1). For each channel No. j correlation is always performed with channel No. 1 (in this example). Thereafter, the process is repeated starting from the instant at which the second channel is set up, which might have been part of the channels No. j compared initially with No. 1, but the process is exactly the same (up channel CM2 compared with down channel CDk, and then optionally up channel CMk is compared with down channel CD2).

In the event of twofold comparison/correlation, the treatment module MT decides to implement local routing of the local traffic on the condition firstly that there is correlation between certain data conveyed by the first up channel CM1 and data of the same type conveyed by a (second) down channel CDj, and secondly that their is correlation between certain data conveyed by the (second) up channel CMj and data of the same type conveyed by the first down channel CD1.

Figure 4:
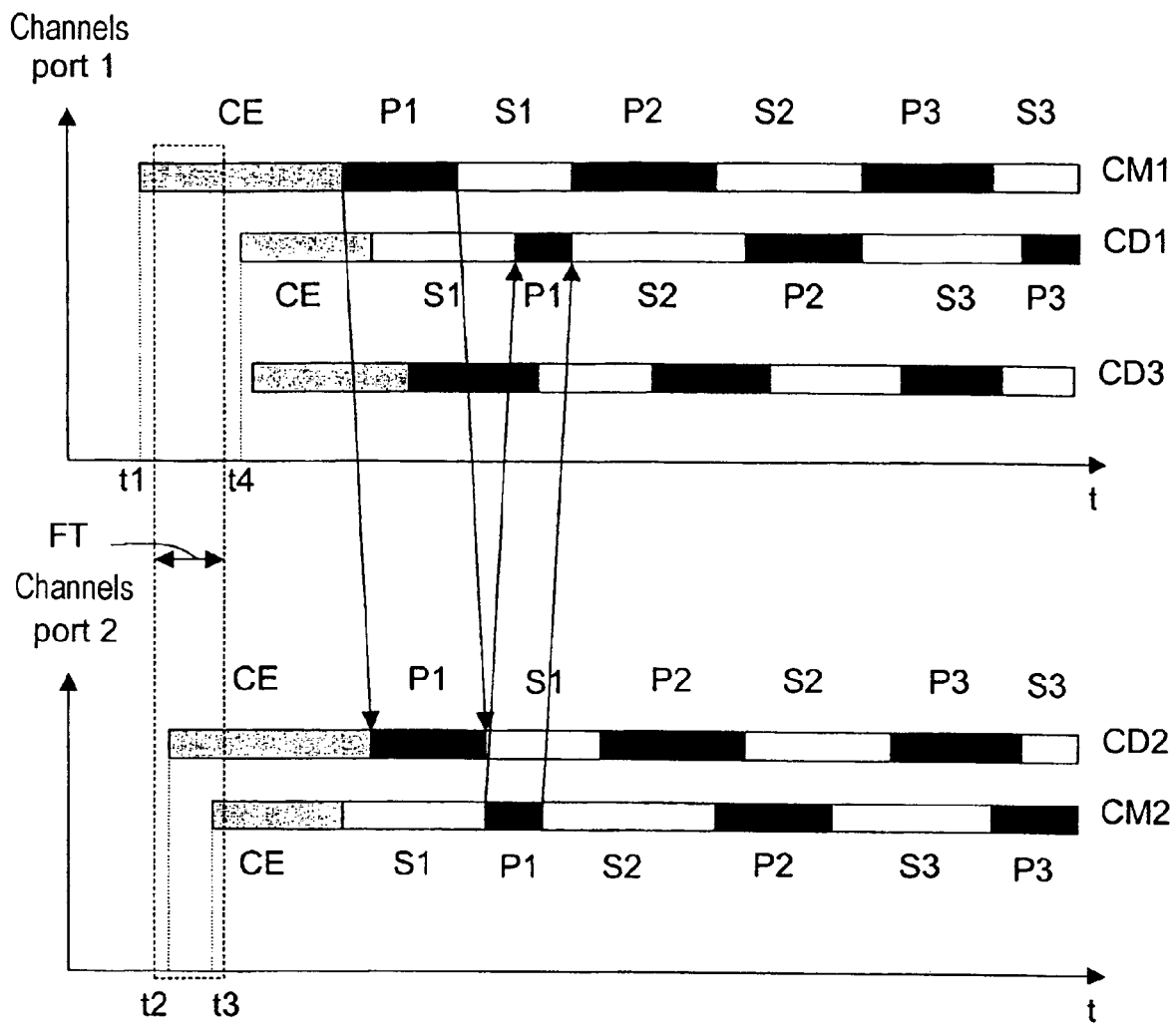
FIG. 4 is a diagram showing an example of channel correlation in accordance with the invention.

In the example shown in FIG. 4, a plurality of down channels are candidates for being correlated with the first up channel CM1, which thus serves as the reference for correlation purposes, and each of them is compared therewith by the treatment module MT. More precisely, these channels are the down channels referenced CD2 leaving via the port 2, and CD3 leaving via the port 1. Since the instant at which the down channel CD3 is set up does not lie within the time window FT, the data of this channel CD3 is not compared with the data of the first up channel CM1. The probability of the channel CD3 being a "reflection" of the first up channel CM1 is considered as being zero (delay very different from a typical delay). In contrast, the down channel CD2 lies within the time window FT and its data is compared with the data of the first up channel CM1. The correlation process is also set up on the return traffic: down traffic CD1 with up traffic CM2.

It is important to observe that the comparison/correlation process is applied to all candidate channels, whether conveyed via the same physical port or via some other physical port, providing the instant at which a channel is set up lies within the time window FT associated with the first up channel CM1. Only the channel leaving on the same port as the first up channel and having the same position within a frame is excluded from the comparison/correlation process, it being understood that in theory it constitutes the return channel of the channel in question. When a call is set up, a physical position is reserved within the frame conveyed by the incoming port, and the same physical position is generally reserved within the frame conveyed by the associated outgoing port; this physical position constitutes the incoming and outgoing transmission channel medium. It is therefore inappropriate to attempt correlation between the incoming port and the outgoing port for a single physical channel since both streams relate to the same subscriber.

Comparison/correlation can be performed on signaling data, as exchanged in particular between mobile telephones and the central call switch MSC while a call is being set up, and/or on traffic data.

When comparison is performed solely on traffic data, at least three possibilities can be envisaged.

A first possibility consists in comparing a binary signal characterizing the presence of speech (or voice) or of silence on a channel TCH.

Under such circumstances, the treatment module MT considers that data belonging to two channels that are spaced apart in time is correlated when it presents binary signals that are identical or that present a high degree of covariance. This notion of a high degree of covariance is set by means of a selected threshold which is essentially a function of the number of samples taken into account in the correlation process.

A second possibility consists in comparing voice data at 64 kbps. When used at the A-bis or A-ter interface, the treatment module MT then has a decompression module of a type similar to that included in a transcoder TC for performing standard GSM decoding. The treatment module MT then decides that two channels that are spaced apart in time are correlated when the delayed reference signal and the signal carried by the candidate channel present a high degree of covariance.

A third possibility consists in comparing the values of one or more critical parameters, that are the most representative of the content and the time and frequency characteristics of compressed voice. These critical parameters can relate either to the most significant components of the compressed voice, or else to a fraction of these components, such as those defined by GSM standard 06.10 for full rate (FR) type encoding, or in GSM standard 06.60 for enhanced full rate (EFR) type encoding, or in GSM standard 06.20 for half rate (HR) type encoding, or indeed in GSM standard 06.71 for adaptive multi-rate (AMR) type encoding, and in the associated standards. This analysis can also be performed on an optionally linear combination of a plurality of these parameters that are considered as being critical for this correlation process.

Amongst the critical parameters that can be used for comparison/correlation with full rate type encoding, mention can be made, for example, of the "log area ratio" which comprises eight logarithmic values generated every 20 ms and representative of short-term filter reflection coefficients, the "block amplitude" which comprises a value generated every 5 ms and representative of the amplitude of the excitation signal, and the "RPE pulses Nos. 1 to 13" which constitute a vector that is generated every 5 ms and that characterizes the excitation signal.

Comparison/correlation as performed on the compressed voice components makes it possible significantly to reduce the number of values that need to be correlated, and thus the volume of resources that need to be used. However this also makes it possible to reduce the time delay between a new channel appearing and local routing being put into place in the event of the call being a local call.

It is advantageous for the treatment module MT to perform its comparisons/correlations by determining the covariance ($cov_c(\tau)$) between the signal $S_c$ carried by the candidate channel and the signal $S_{ref}$ carried by the reference channel (first up channel CM1). The expression for the covariance $cov_c(\tau)$ is given below:

$$cov_c(\tau) = \frac{1}{N} \cdot \sum_{i=1}^{N} [s_c(t_i) - \bar{s}_c] \cdot [s_{ref}(t_i - \tau) - \bar{s}_{ref}]$$

where:
- $\tau$ designates the different delay values between the candidate channel $S_c$ and the reference channel $S_{ref}$ over a range of values centered on the typical delay (about 2×270 ms for a remote link via satellite, taking account of the go-and-return path that applies to a local call and the processing and routing delays of the various network elements, in particular the transcoder TC and the central call switch MSC, which in all amounts to about 60 ms);
- the range [1, N] represents the range of successive samples taken into account in the comparison/correlation process;
- $\bar{s}_c$ is the mean value of the signal $s_c$ over the range of samples taken into account; and
- $\bar{s}_{ref}$ is the mean value of the signal $s_{ref}$ over the range of samples taken into consideration.

The candidate channel that is selected by the treatment module MT is then the signal which presents covariance having the greatest value. If no candidate channel presents a covariance value exceeding a selected threshold, then no channel is selected and the call as set up for subscriber 1 (using the first terminal T1) is maintained over its initial route.

Naturally, other comparison/correlation criteria can be used, in particular analyzing sample identities with the tolerance threshold (proximity analysis) or using neural network type techniques.

It should be observed that it is also possible to use a validity criterion enabling a selected signal (and thus the corresponding channel) to be rejected in the event of non-significant samples being taken into account. That can happen, in particular, when one or both of the signals being analyzed is/are weak, e.g. in the event of a long silence from one of the users of the mobile telephones T1 and T2, or in the event of a signal being abnormally attenuated. Under such circumstances, local routing is not applied. This validity criterion can be implemented, for example, using a selected threshold which is compared with each covariance value.

When comparison applies solely to signaling data, at least four possibilities can be envisaged.

A first possibility consists in comparing data representative of the call identifier of the called terminal (T2), such as its telephone number, for example.

Under such circumstances, the treatment module MT considers the data as being correlated when the data of the reference channel and the data of a candidate channel both present the call identifier of the called terminal T2.

A second possibility consists in comparing data representative firstly of the call identifier of the called terminal (T2), such as its telephone number, and secondly the call identifier of the calling terminal (T1), such as its telephone number, for example.

Under such circumstances, the treatment module MT considers that the data is correlated when the data of the reference channel and the data of a candidate channel both represent the call identifier of the called terminal T2 and the call identifier of the calling terminal T1.

A third possibility consists in comparing/correlating data representative of a traffic identifier associated with a channel identifier. In some circumstances, such as that known a tandem free operation (TFO), it is possible to include an optional field in the signaling frames that includes, for example, an identifier specifying the traffic to which the frames belong, and also an identifier specifying the channel conveying them.

Under such circumstances, the treatment module MT considers that the data of the signaling field conveyed by a candidate channel is correlated with the data of the same signaling field conveyed by the reference channel (CM1) when said data represents the same traffic identifier and the channel identifier.

It is also possible to envisage a fourth possibility consisting, for example, in comparing/correlating one or two commmunications identifiers and the traffic and channel identifiers.

Furthermore, it is also possible to envisage performing comparison/correlation that applies both to traffic data and to signaling data. Thus, for example, it is possible to envisage comparison/correlation applying both to the call identifier of the called telephone and to the compressed voice data.

It is recalled that the above applies equally well to single comparison/correlation in which only the first up channel CM1 is used as a reference channel, and to dual comparison/correlation in which both the first and second up channels CM1 and CM2 are used as reference channels.

In order to be able to compare/correlate the data conveyed by the first up channel CM1 with the data conveyed by a candidate channel that reaches it later, the treatment module MT of the device D begins by copying said data for comparison. Thereafter, it applies a time offset to the copied data, said offset being selected as a function of the go-and-return time for reaching the central call switch MSC and returning therefrom. The module can then compare the copied and the time-offset data with the data conveyed by each candidate channel that was set up within the time window FT. In the presence of compressed voice data, the treatment module MT is arranged to decompress the data, if necessary, after copying it.

The example of FIG. 4 illustrates dual comparison/correlation on compressed voice data. As can be seen, comparison/correlation performed by the treatment module MT shows firstly that the compressed data of the frame P1 of the first up channel CM1 is correlated with the compressed data of the frame P1 of the second down channel CD2, and secondly that the compressed data of the frame P1 of the second up channel CM2 is correlated with the compressed data of the frame P1 of the first down channel CD1.

Figure 8:
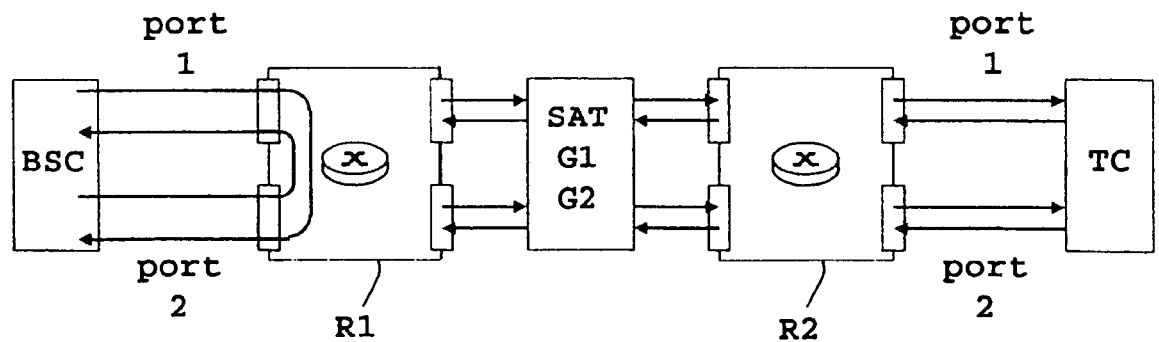
FIG. 8 is a diagram showing an example of local routing in accordance with the invention within the network of FIG. 1.
Figure 9:
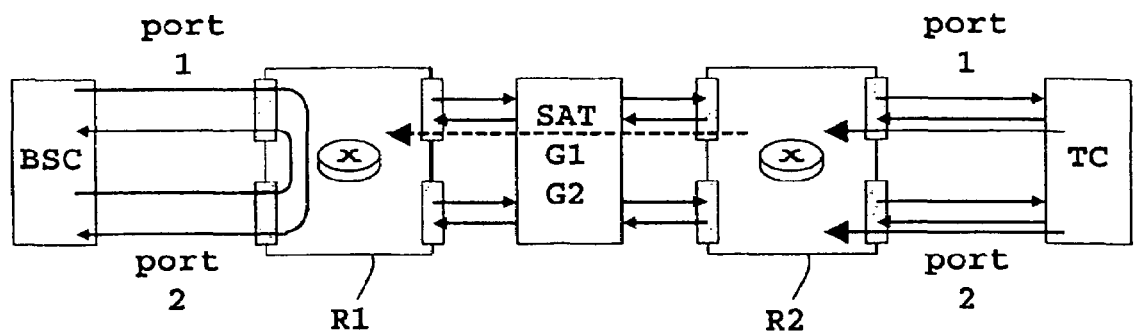
FIG. 9 is a diagram showing an example of conference mode being detected within the FIG. 1 network while local routing in accordance with the invention is already active.

In other words, this is a situation in which channel i on port x is equal to channel j on port y, both on entering the port and on leaving the port (more precisely, the signal entering on channel j via port x the BSC side is equal to the signal leaving on channel j via port y on the BSC side, and the signal leaving on channel i via port x on the BSC side is equal to the signal entering on channel j via port y on the BSC side). The treatment module MT then deduces that the traffic from the first up channel CM1 is local traffic. It then instructs the router module MR of the first router R1 to route this traffic locally until the end of the call, unless it receives counter instructions. Local routing is then put into place by the first router R1 directly between channel i of port x (in this case No. 1) and channel j of port y (in this case No. 2), and in both directions, with the remote link via the satellite being suspended for all four corresponding channels. This situation is illustrated in FIG. 8.

In the invention, the local routing device D can be arranged so as to allow calls to be established in so-called "conference" mode. In this mode, a fixed or mobile, calling or called, third telephone T3 joins the call already set up between the first and second mobile telephones T1 and T2.

To do this, the incoming traffic coming from the central call switch MSC via the transcoder TC is analyzed throughout the duration of a call, i.e. so long as TCH frames are present on each channel that has been set up. Thus, as soon as the mobile telephone T3 of a third subscriber seeks to join an ongoing call between mobile telephones T1 and T2 in conference mode, the second router R2 detects the speech frames which it forwards both to the input of channel i of port x and to the input of channel 1 of port y which are the subject of the local routing.

The second router R2 then sends a dedicated message to the device D of the first router R1 informing it that it has just detected speech frames coming from the transcoder TC. This message preferably contains the port number and the channel number concerned. On receiving this message, the treatment module MT of the device D instructs the router module MR of the first router R1 to suspend the local routing and to return to conventional routing of speech frames to the central call switch MSC via the satellite link G1, SAT, G2.

The local routing device D of the invention can also be arranged in such a manner as to enable the up local traffic that has been subjected to local routing to be monitored via the central core switch MSC.

Figure 10:
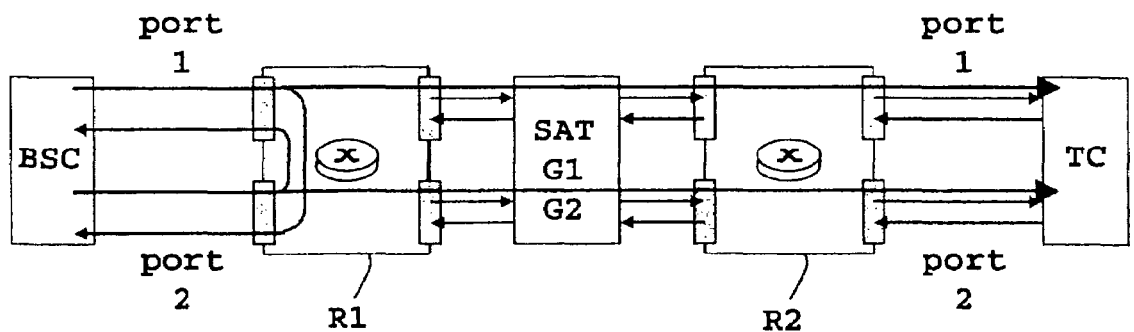
FIG. 10 is a diagram showing an example of local routing in accordance with the invention within the FIG. 1 network, and designed to satisfy monitoring constraints.

Under such circumstances, the treatment module MT of the device D is arranged, on receiving a request to monitor the first and second up channels CM1 and CM2, to instruct the router module MR of the first router R1 to duplicate the traffic conveyed by the first and second up channels CM1 and CM2 so that firstly it is routed locally and directly using the mechanism described above, and secondly it is transmitted via the satellite link G1, SAT, G2 to the central call switch MSC. The down traffic is not concerned since it has no need to transit via the satellite link, providing local routing remains active. This situation is shown in FIG. 10.

The process of tapping a local call for monitoring purposes can be activated for all calls, or for a fraction of calls only, in controlled manner, and preferably via the second router R2.

The local routing device D of the invention may also be arranged in such a manner as to enable the network to transmit traffic data in frames of the transcoder/rate adaptor unit (TRAU) type over the A-bis and A-ter interfaces. Under such circumstances, the transcoder TC is adapted to convert speech data compressed to 13 kbps into speech data digitized on 64 kbps in order to make the speech channels compatible with the central call switch MSC.

Figure 11:
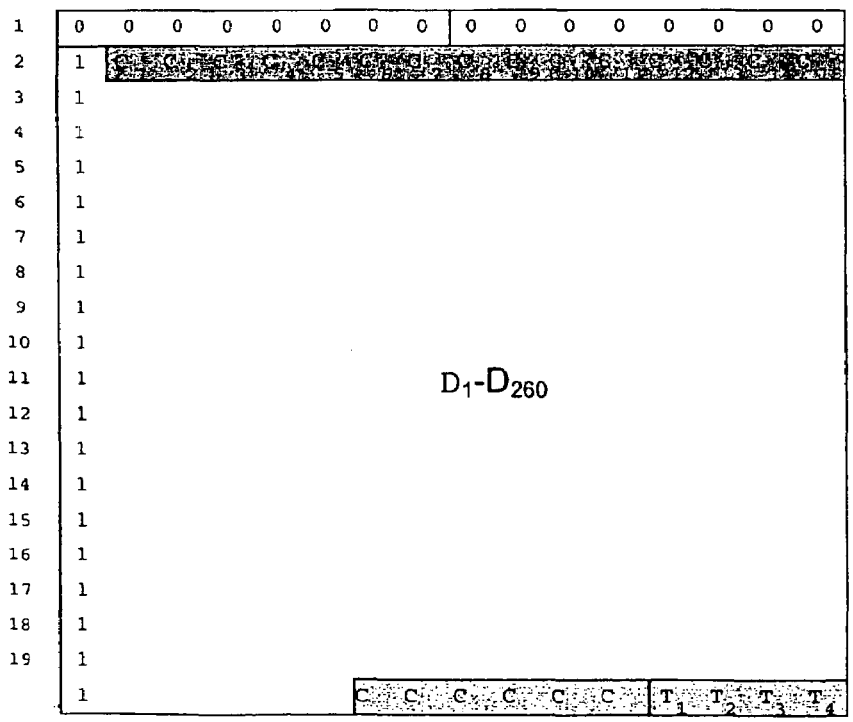
FIG. 11 is a diagram showing an example of a TRAU type frame.

An example of a TRAU frame is shown in FIG. 11, for voice data that is compressed in full rate mode (FR).

The TRAU frame comprises 20 16-bit words, the synchronization sequence which is located at the boundaries of the frame, being constituted by the first 16 bits being set to 0 and then one bit set to 1 at the beginning of each 16-bit word. Bits $C_1$ to $C_{21}$ are check bits, characterizing the content of the frame (specifically speech frame, rest frame, non-valid frame, silence description, and the like). The bits $T_1$ to $T_4$ are time alignment bits used for aligning frames in time at the remote transcoder under the control of the base station BTS concerned. Finally, $D_1$ to $D_{260}$ are useful data conveyed by the frame TRAU.

Such a frame is transmitted at a rate of 2 bits per E1 frame for a full rate channel (at 16 kbps).

A more sophisticated method of compressing TRAU frames can also be used together with the invention in order to further reduce the amount of satellite capacity that is used. This method is described in French patent application FR 03/14755, the descriptive content of which is incorporated herein by reference.

It consists firstly in transmitting speech frames unchanged or in a compacted form by eliminating the redundant information contained therein, and secondly rest frames and non-valid frames in a compacted form by eliminating in addition the information of the field $D_1$ to $D_{260}$ which is redundant, i.e. in this case it is not meaningful. Silence description frames (SID) are processed in the same manner as silence frames, but with the fields $D_1$ to $D_{260}$ being transmitted in asynchronous manner so as to contribute to smoothing the compressed flow so as to use as little capacity as possible for transmitting the compressed flow.

When local routing of local traffic is activated, it is therefore necessary to transmit information to the transcoder TC coupled to the central call switch MSC. To do this, two solutions can be envisaged.

A first solution consists in generating a binary flag in each treatment module MT of the device D for each channel involved in local routing, the flag specifying that the corresponding call is still in progress, and then instructing the first router R1 to transmit the call to the second router R2 via the satellite link G1, SAT, and G2.

As soon as TRAU frames become absent at the input i of port x and/or input j of port y, both the subject of local routing, the binary flag relating to the call changes state so as to inform the second router R2 that the call has terminated.

So long as the binary flag indicating that a call is in progress is active, the second router R2 generates TRAU frames and delivers them as replacements for the frames that the transcoders TC would have received in the absence of local routing. These TRAU frames are either rest frames, or dummy speech frames, serving to enable the network to function normally in the transcoder TC and the central call switch MSC. The upstream portion of the network containing these two items of equipment is, so to speak, "decoyed". They have the impression that they are continuing to convey a call, whereas the frames they are conveying do not obtain useful data, except in conference mode or while monitoring is taking place.

When the call comes to an end, the binary flag changes state, so the second router R2 ceases to generate TRAU frames for sending to the transcoder TC on output i of port x and output j of port y.

A second solution consists in arranging the treatment module MT of the device D in such a manner as to instruct the first router R1 to send data to the second router R2 of the same type as the data that is sent in the presence of rest frames or non-valid frames. Thus, only the control bit and the time alignment word (bits $T_1$ to $T_4$) are then transmitted from the first router R1 in a compacted form, thereby eliminating all information that is not pertinent or redundant.

The second router R2 reconstitutes the frames in which the control bits and the time alignment word are identical reproductions of that which was present at the input of the first router R1 for the channels concerned by the local routing. Only the data $D_1$ to $D_{260}$ is not reproduced identically, and this does not present any problem since the content of the frames is not used, except during monitoring.

The same mechanism applies in the down direction, i.e. from the second router R2 to the first router R1. The frames played back by the first router R1 on output i of its port x and output j of its port y are then regenerated using the compacted data coming from the second router R2, concerning the control bits and the time alignment word. The data field $D_1$ to $D_{260}$ in each regenerated frame is filled with the data field $D_1$ to $D_{260}$ previously copied on the up input channel, as stored temporarily in a memory.

The first router R1 thus performs the function of locally routing local traffic while still reproducing frames that are faithful copies of the TRAU frames that would have been obtained without local routing. The time alignment process which consists in the base station BTS concerned monitoring the phasing of the frames that are applied to its input by the action of the transcoder, is reproduced herein by the first router R1 under the control of the treatment module MT of the device D.

This makes it possible to emulate that portion of the network that is situated beside the central call switch MSC in a manner that is much more faithful, and thus makes it possible to avoid the need to adapt the base stations BTS and/or the base station controller BSC. The decoy is thus totally effective for the equipment situated at the remote site (BTS for an A-bis remote link, or BTS and BSC for an A-ter remote link), and concerning the portion of the network that includes the transcoder TC and the central call switch MSC.

Finally, the local routing device D of the invention can also be arranged, when performing comparison/correlation on traffic data, to enable the end-to-end delay to be reproduced that was present at the beginning of the call. This initial delay is typically about 600 ms (2×270 ms for the go-and-return transmission time via the satellite link G1, SAT, G2, plus about 60 ms of delay introduced by the network equipment). To do this, once local and direct routing has been established, the treatment module MT of the device D acts to order the first router R1 to reduce the end-to-end delay that is being provided.

This reduction in end-to-end delay is preferably performed progressively towards a selected value, e.g. equal to zero. It preferably takes place during periods of silence or decrementally during periods of speech and silence.

The local routing device D of the invention, and in particular its treatment module MT can be implemented in the form of electronic circuits, software (or computer) modules, of a combination of circuits and software.

The invention enables the amount of satellite capacity that is used to be reduced significantly by keeping local traffic local. Thus, on remotely deployed sites where there is generally no terrestrial infrastructure, and in which local traffic can amount to as much as 80% of traffic volume, the saving in terms of satellite capacity can be as great as about 80%. In addition, by combining local routing of the invention with an improved method of compressing TRAU frames (of the type described above), it is possible to reduce traffic transmitting via the satellite by about another 50%, thus achieving an overall saving in terms of satellite capacity of about 90%.

The invention is not limited to the embodiments of the local routing device and the traffic router described above, merely by way of example, but covers any variant that might be envisaged by the person skilled in the art within the ambit of the following claims.

What is claimed is:

1. A device, for routing traffic between communications terminals, for a traffic router connected via a portion of a transmission network to a radiocommunications network including a call switch, the device comprising:
   a processor arranged as follows:
      in an event of first and second up traffic channels being set up between calling and called terminals and said call switch, and first and second down traffic channels being set up between said call switch and said calling and called terminals, to compare selected data conveyed in said first up traffic channel with data conveyed in at least one down traffic channel set up after said first up traffic channel and in a selected time window, and
      in the event the comparison of said selected data results in a correlation between said data being conveyed in the first up traffic channel and said data being conveyed in the at least one down traffic channel, to instruct said traffic router to route the traffic locally and directly from the first up channel to the second down channel, and from the second up channel to the first down channel, without said traffic being sent to said call switch,
   wherein said processor is arranged to copy said data for comparison as conveyed by said first up channel and to apply to said copied data a time offset that is selected as a function of go-and-return time for reaching said call switch and returning therefrom, and to compare said copied and time-offset data with the data conveyed by each down channel set up after said first up traffic channel and within said selected time window.

2. The device according to claim 1, wherein said processor is arranged to compare selected data conveyed in said first up traffic channel and in each down traffic channel set up after said first up traffic channel and within said selected time window.

3. The device according to claim 1, wherein said processor is arranged to decompress said data after said copying.

4. The device according to claim 1, wherein said processor is arranged to compare the selected data conveyed in said second up traffic channel and in the first down the traffic the channel, and in the event of the comparison finding a correlation between said conveyed data, to instruct said traffic router to route locally and directly the traffic from the first up channel to the second down channel and from the second up channel to the first down channel, without sending said traffic to said call switch.

5. The device according to claim 1, wherein said compared data is signaling data and/or traffic data.

6. The device according to claim 5, wherein said signaling data is at least representative of the call identifier of the called terminal, and wherein said processor is arranged to consider said data as being correlated when said data presents the same call identifier for the called terminal.

7. The device according to claim 6, wherein said signaling data is representative of the call identifier of the calling terminal, and wherein said processor is arranged to consider said data as being correlated when said data represents the same call identifier for the calling terminal.

8. The device according to claim 5, wherein said signaling data is representative of a traffic identifier associated with a channel identifier, and wherein said processor is arranged to consider said data as being correlated when said data represents the same traffic identifier associated with the same channel identifier.

9. The device according to claim 5, wherein said traffic data is in the form of binary signals characterizing the presence of speech or silence, and wherein said processor is arranged to consider said data as being correlated when said data represents binary signals that are identical or quasi-identical.

10. The device according to claim 9, wherein said processor is arranged to determine a covariance value between said conveyed data, and to consider data as being correlated when said data presents the highest covariance value, and when said value is greater than a selected threshold.

11. The device according to claim 5, wherein said traffic data is non-compressed voice data.

12. The device according to claim 5, wherein said traffic data is constituted by the values of one or more critical parameters that are the most representative of the content and the time and frequency characteristics of compressed voice.

13. The device according to claim 1, wherein, in an event of a request for monitoring said first and second up channels, said processor is arranged to instruct said traffic router to duplicate the traffic conveyed by said first and second up channels, to route said data locally and directly, and to transmit said data via said transmission network portion to said call switch.

14. The device according to claim 1, wherein, once said local and direct routing has been set up, said processor is arranged to instruct said traffic router to send binary flags to another traffic router that is coupled to said traffic router via said traffic and network portion, the flags indicating that the direct connection between the calling and called terminals is ongoing.

15. The device according to claim 1, wherein, once said local and direct routing has been set up, said processor is arranged to instruct said traffic router to reduce a deferred transmission delay of the traffic frames to be routed locally and directly, which delay is initially representative of go-and-return time needed for reaching said call switch and to return therefrom.

16. The device according to claim 15, wherein said processor is arranged to instruct progressive reduction in the transmission delay towards a selected value.

17. A traffic router for a radio communications network comprising:
   at least a transmission network portion; and
   a call switch,
      wherein the router comprises at least one routing device according to claim 1.

18. A device, for routing traffic between communications terminals, for a traffic router connected via a portion of a transmission network to a radiocommunications network including a call switch, the device comprising:
   a processor arranged as follows:
      in an event of first and second up traffic channels being set up between calling and called terminals and said call switch, and first and second down traffic channels being set up between said call switch and said calling and called terminals, to compare selected data conveyed in said first up traffic channel with data conveyed in at least one down traffic channel set up after said first up traffic channel and in a selected time window, and
      in the event the comparison of said selected data results in a correlation between said data being conveyed in the first up traffic channel and said data being conveyed in the at least one down traffic channel, to instruct said traffic router to route the traffic locally and directly from the first up channel to the second down channel, and from the second up channel to the first down channel, without said traffic being sent to said call switch,
   wherein, on receiving an instruction indicating that third up and down channels have been set up between a third communications terminal and said call switch for the purpose of setting up a conference mode connection with said calling and called terminals, said processor are arranged to instruct said traffic router to interrupt said local and direct routing of the traffic and to return to routing via said call switch.

19. A device, for routing traffic between communications terminals, for a traffic router connected via a portion of a transmission network to a radiocommunications network including a call switch, the device comprising:
   a processor arranged as follows:
      in an event of first and second up traffic channels being set up between calling and called terminals and said call switch, and first and second down traffic channels being set up between said call switch and said calling and called terminals, to compare selected data conveyed in said first up traffic channel with data conveyed in at least one down traffic channel set up after said first up traffic channel and in a selected time window, and
      in the event the comparison of said selected data results in a correlation between said data being conveyed in the first up traffic channel and said data being conveyed in the at least one down traffic channel, to instruct said traffic router to route the traffic locally and directly from the first up channel to the second down channel, and from the second up channel to the first down channel, without said traffic being sent to said call switch,
   wherein, once said local and direct routing has been set up, said processor is arranged to instruct said traffic router to send control bits in a compressed form to another traffic router that is coupled to said traffic router via said transmission network portion, the control bits being the control bits associated with time alignment words corresponding to rest frames or to non-valid frames throughout the duration of the call between said calling and called terminals.

\* \* \* \* \*

UNITED STATES PATENT AND TRADEMARK OFFICE
CERTIFICATE OF CORRECTION

PATENT NO. : 7,620,012 B2 Page 1 of 1
APPLICATION NO. : 11/134493
DATED : November 17, 2009
INVENTOR(S) : Farineau et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1016 days.

Signed and Sealed this

Twenty-sixth Day of October, 2010

David J. Kappos
*Director of the United States Patent and Trademark Office*